United States Patent [19]

Rushing et al.

[11] Patent Number: 5,330,579

[45] Date of Patent: Jul. 19, 1994

[54] APPARATUS AND METHOD FOR SPENT SOLVENT COLLECTION

[75] Inventors: J. Carroll Rushing, Greenville, S.C.; Donald E. Stanley, Tyrone, Ga.

[73] Assignee: EZE Products, Inc., Greer, S.C.

[21] Appl. No.: 923,789

[22] PCT Filed: Feb. 26, 1990

[86] PCT No.: PCT/US90/01074

§ 371 Date: Sep. 21, 1992

§ 102(e) Date: Sep. 21, 1992

[87] PCT Pub. No.: WO91/12906

PCT Pub. Date: Sep. 5, 1991

[51] Int. Cl.$^5$ .......................... B08B 13/00; B64F 5/00
[52] U.S. Cl. ...................... 134/12; 134/38; 134/109; 134/123; 15/DIG. 2; 220/573; 239/121
[58] Field of Search .............. 15/DIG. 2, 53 R, 53 A, 15/97 B; 134/12, 38, 42, 109, 123, 182, 183, 201; 220/573; 280/79.2; 118/501; 239/121, 122

[56] References Cited

U.S. PATENT DOCUMENTS

| | | |
|---|---|---|
| 1,608,635 | 11/1921 | Theriot . |
| 1,842,099 | 1/1932 | Johnson . |
| 2,419,397 | 4/1947 | Frohoff et al. . |
| 2,733,723 | 2/1956 | Whitcomb . |
| 3,460,177 | 8/1969 | Rhinehart et al. . |
| 4,146,044 | 3/1979 | Dow . |
| 4,378,755 | 4/1983 | Magnusson et al. . |
| 4,654,087 | 3/1987 | Fujita et al. . |

Primary Examiner—Philip R. Coe
Attorney, Agent, or Firm—Dority & Manning

[57] ABSTRACT

An apparatus and method are provided for use in removal of coatings from airplanes and the like wherein such removal requires the application of a solvent composition for dissolving the coating such as paint, the solvent having a sufficiently high vapor pressure to be present in both a liquid phase and a gaseous vapor phase at stripping temperatures with the solvent in the vapor phase being lighter than the liquid phase and heavier than air, and the apparatus including a portable carriage, positionable beneath the airplane, a receptacle having spaced side walls and carried by the carriage, the side walls extending vertically upwardly, the receptacle further defining a receptacle bottom portion, the receptacle receiving spent solvent in both the liquid and the vapor phases after application of the solvent to the airplane surfaces and dissolution of the paint therein, the side walls directing the received spent solvent in both phases to the receptacle bottom portion such that vapor phase is trapped above the heavier liquid phase by the lighter air thereover, and an exhaust port located above the receptacle bottom portion for removing the vapor phase.

23 Claims, 6 Drawing Sheets

APPARATUS AND METHOD FOR SPENT SOLVENT COLLECTION

TECHNICAL FIELD

The present invention is related generally to a system for collecting spent solvent during the removal of coatings such as paint from large objects, and particularly to an apparatus, system and method for use during the removal of paint from airplanes.

BACKGROUND ART

The removal of paint from large objects such as airplanes and the like poses inherent dangers to the workers involved, as well as to the surrounding environment. Generally, the surfaces of the airplane are sprayed with paint remover (stripper) in a maintenance hangar with large fans employed to drive away, or at least reduce the concentration of, toxic fumes generated during the stripping operation. Although the workers involved in the paint removal operation typically wear protective clothing such as gloves and gas masks, workers in other areas of the hangar working on other jobs are usually not so protected and are placed at risk by exposure to the contaminated fumes.

Further, in such stripping operations, liquid paint remover is generally allowed to run onto the floor, not only posing health risks to the workers in the hangar, but also to the surrounding land and ground water from run-off and drainage. Additionally, such spent liquid paint remover becomes sticky with the components of stripped paint dissolved therein. Thus, the job of removing paint from airplanes generally involves two jobs, stripping of the paint from the airplane and then clean-up of the spent paint remover from the hangar floor, both of which pose serious health risks to the workers involved.

One example of a prior art device for the removal of surface coatings such as paint from the surfaces of large objects is disclosed in U.S. Pat. No. 1,842,099 to Johnson which describes a portable unit with a series of lines for pumping a heated solvent into a pipe network surrounding the object to be treated, such pipes including perforations for spraying the hot cleanser onto the object. Gutters are positioned at lower edges of the object for receiving spent solvent. Drainage pipes and lines return the liquid solvent to the portable unit where it is filtered, and then reheated and once again pumped onto the object being treated.

U.S. Pat. No. 1,608,635 to Theriot discloses a similar portable apparatus for removing paint wherein a stripping solution is heated and pumped into a discharge line for spraying onto the object to be stripped with such object being placed on an inclined platform having a gutter leading therefrom which returns spent solvent to a receiving tank on the portable unit.

U.S. Pat. No. 2,419,397 to Frohoff et al. discloses a stationary spraying rack for railway cars. Such rack generally forms a housing having a track running therethrough such that the railway car may be positioned therein and sprayed down with hot alkaline solution. The spent cleaning solution is then drained from the floor of the rack and delivered to a reconditioning tank. Similarly, the more recent U.S. Pat. No. 4,378,755 to Magnusson et al. discloses a stationary housing for de-icing and cleaning airplanes. The airplane to be cleaned is slowly taxied through the housing wherein it is sprayed with a de-icing or cleaning solution. The spent solution is removed by draining ducts formed in the floor of the housing and collected in a tank for subsequent purification.

Generally, early prior art patents directed to methods for stripping paint from objects have employed heating a stripping solution. While some present day paint solvents are heated for use, others are employed at room temperatures. The primary component of many popular paint strippers, methylene chloride, has a boiling point of 40° C. or 106° F. and is generally used at room temperatures. Such low boiling point, coupled with a correspondingly high vapor pressure, accounts for the contaminating fumes common to paint stripping operations which, as discussed above, endanger not only the workers involved but also others in the area. And, paint strippers which are heated for use, although liquid at room temperature, similarly form noxious fumes upon heating to stripping temperatures. However, such fumes are often readily dispersed. But, because methylene chloride vapor is heavier than air, the fumes generated thereby are not readily dispersed, but rather tend to remain low, being trapped by the air.

Examples of portable units known for use in removing coatings from airplanes are U.S. Pat. No. 2,733,723 to Whitcomb and U.S. Pat. No. 4,146,044 to Dow, both of which are directed to cleaning the inner surfaces of airplane fuel tanks and do not address the problems of removing paint or grease from the large exterior surfaces of the airplane. Such task is generally performed by spraying such surfaces in a hangar with the fumes dispersed by fans and the spent liquid solvent collected on the hangar floor for subsequent clean up. Although it is generally known to provide troughs or gutters under the airplane edges to catch the liquid solvent which drips therefrom, thereby facilitating the clean-up phase of the stripping job, there is no known prior art method for trapping or containing the hazardous solvent fumes generated during stripping. Further, there is no known prior art method for collecting and re-processing such fumes for subsequent re-use as a solvent.

DISCLOSURE OF INVENTION

The present invention recognizes and addresses the foregoing disadvantages, and others, of prior art paint stripper collection systems. Accordingly, it is one general object of the present invention to provide an improved paint solvent collection apparatus, system, and method.

Another object is the provision of a method for stripping paint from airplanes which will significantly reduce the concentration of toxic chemicals, in both the liquid and gas phases, dispersed during such operation.

It is yet another object of the present invention to provide an apparatus for use in paint stripping which decreases the clean up required after stripping.

It is a still further object of the present invention to provide a system for use in paint stripping which employs interconnected individual units such that objects of any size or shape may be accommodated.

It is a still further object of the present invention to provide a method for stripping paint from the upper portion of airplanes which does not allow dissolved paint to run onto unpainted lower surfaces.

It is yet another object of the present invention to provide a system for use during the stripping of paint from airplanes which reduces the concentration of toxic methylene chloride fumes generated in the stripping operation.

These as well as other objects are achieved by providing an apparatus for use in the removal of coatings from airplanes and the like, the removal requiring the application of a solvent composition to the surfaces of an airplane for dissolving or bond releasing of a coating such as paint and the like thereon, the solvent composition having a sufficiently high vapor pressure to be present in both a liquid phase and a gaseous vapor phase at operating temperatures, the solvent in the vapor phase being lighter than the liquid phase and heavier than air, with the apparatus including a portable carriage positionable beneath the airplane, a receptacle having spaced side walls and carried by the carriage, the side walls extending vertically upwardly, the receptacle further defining a bottom portion, the receptacle receiving spent solvent in both the liquid and the vapor phases after application of the solvent to the airplane surfaces, and dissolution of the paint therein, the side walls directing the received spent solvent in both phases to the bottom portion such that the vapor phase is trapped above the heavier liquid phase on the bottom portion by the lighter air thereover, and an exhaust port located above the bottom portion for removing the vapor phase.

Preferably, the side walls of the receptacle diverge outwardly from the bottom portion. Most preferably, a drain means is provided at the receptacle bottom-portion for removing the spent solvent in the liquid phase.

More particularly, the present objects are achieved by providing a collection system for use in the removal of coatings from airplanes and the like, the removal requiring the application of a solvent composition to the surfaces of an airplane for dissolving or bond releasing a coating such as paint and the like thereon, the solvent composition having a sufficiently high vapor pressure to be present in both a liquid phase and a gaseous vapor phase at stripping temperatures, the solvent in the vapor phase being lighter than the liquid phase and heavier than air, the system including a plurality of spent solvent collection units, each unit having a portable carriage positionable beneath the airplane, a receptacle having spaced side walls and carried by the carriage, the side walls extending vertically upwardly, the receptacle further defining a receptacle bottom portion, the receptacle receiving spent solvent in both the liquid and the vapor phases after application of the solvent to the airplane surfaces, and dissolution of the paint therein, the side walls directing the received spent solvent in both phases to the bottom portion such that the vapor phase is trapped above the heavier liquid phase on the bottom portion by the lighter air thereover, and an exhaust port located above the bottom portion for removing the vapor phase, the system further including connection means for interconnecting the spaced side walls of the receptacles thereby interconnecting the collection units such that a continuous solvent receiving means is formed along the length and width of the interconnected units.

Preferably, such collection system further includes a vapor receiving unit with suction lines extending therefrom and communicating with the exhaust ports of the interconnected spent solvent collection units for drawing the solvent in the vapor phase from the collection units to the vapor receiving unit, the vapor receiving unit further including a chiller for lowering the temperature of the received solvent in the vapor phase sufficiently to condense same to the liquid phase.

More particularly, the present objects are achieved by providing a collection system for use in the removal of coatings from airplanes and the like, the removal requiring the application of a solvent composition to the surfaces of an airplane for dissolving a coating such as paint and the like thereon, the solvent composition having a sufficiently high vapor pressure to be present in both a liquid phase and a gaseous vapor phase at stripping temperatures, the solvent in the vapor phase being lighter than the liquid phase and heavier than air, such system including a plurality of spent solvent collection units, each unit having a portable carriage positionable beneath the airplane, a receptacle having spaced side walls and carried by the carriage, the side walls extending vertically upwardly, the receptacle further defining a bottom portion, the receptacle receiving spent solvent in both the liquid and the vapor phases after application of the solvent to the airplane surfaces and dissolution of said paint therein, the side walls directing the received spent solvent in both phases to the bottom portion, such that the vapor phase is trapped above the heavier liquid phase on the bottom portion by the lighter air thereover, an exhaust port located above the bottom portion for removing the vapor phase, and a drain means at the receptacle bottom portion for removing the spent solvent in the liquid phase, such system further including connection means for interconnecting the spaced side walls of the collection units such that a continuous solvent receiving means is formed along the length and width of the interconnected units.

It is preferred that such collection system further includes a vapor receiving unit having suction lines extending therefrom and communicating with the exhaust ports of the interconnected spent solvent collection units for drawing the solvent in the vapor phase from the collection units to the vapor receiving unit, such vapor receiving unit further including a chiller for lowering the temperature of the received solvent in the vapor phase sufficiently to condense same to a liquid phase. Moreover, such system preferably also includes a liquid solvent receiving unit associable with each of the drain means for collecting the solvent in the liquid phase from the bottom portions of the collection units.

Most preferably, the present objects are achieved through a method for removing paint from airplanes and the like using a solvent for dissolving the paint, the solvent having a sufficiently high vapor pressure to be present in both a liquid and a gaseous vapor phase at stripping temperatures, the solvent in the vapor phase being lighter than the liquid phase and heavier than air, such method including the steps of providing a plurality of solvent receptacles, positioning the receptacles beneath the airplane, interconnecting the receptacles at spaced side walls thereof, thereby forming a continuous solvent receiving means, stripping the paint from the surfaces of the airplane by applying the solvent thereto, receiving spent solvent in both the liquid and the vapor phases in the continuous solvent receiving means, directing the received spent solvent in both phases to bottom portions defined in the various interconnected receptacles such that solvent in the vapor phase is trapped above the heavier liquid phase by the lighter air thereover at the various bottom portions of the interconnected receptacles and removing the vapor phase from the receptacles through exhaust ports located above the receptacle bottom portions.

In a most preferred embodiment, a method is provided for removing paint from upper surfaces of airplanes and the like using a solvent for dissolving or bond releasing the paint, the solvent having a sufficiently high vapor pressure to be present in both a liquid and a gaseous vapor phase at stripping temperatures, the solvent in the vapor phase being lighter than the liquid phase and heavier than air, the method including the steps of providing a plurality of solvent receiving receptacles, positioning the receptacles beneath the airplane, interconnecting the receptacles at spaced side walls thereof, thereby forming a continuous solvent receiving means, securing the flexible sheet to the surfaces of the airplane below the upper surfaces to be stripped, such that lower edges of the sheet extend downwardly into the continuous solvent receiving means formed by the interconnected receptacles, stripping the paint from the upper surfaces of the airplane by applying the solvent thereto, directing spent solvent in both the liquid and the vapor phases from the upper surfaces of the airplane downwardly to the spent solvent receiving means with the downwardly extending sheet, receiving spent solvent in both the phases in the continuous solvent receiving means, directing the received spent solvent in both phases Go bottom portions defined in the various receptacles forming the continuous solvent receiving means such that solvent in the vapor phase is trapped above the heavier liquid phase by the lighter air thereover at the various bottom portions of the interconnected receptacles, and removing the vapor phase from the receptacles through exhaust ports located above the receptacle bottom portions.

By either method, it is preferable to also include the steps of collecting the spent solvent in the vapor phase removed from the various exhaust ports of the interconnected receptacles and chilling the collected spent solvent in the vapor phase to condense same to a liquid phase. Furthermore, it is preferred to include the step of collecting spent solvent in the liquid phase from the receptacle bottom portions. Most preferably, the stripping step of the present methods is performed at room temperature.

BRIEF DESCRIPTION OF DRAWINGS

A full and enabling disclosure of the present invention, including the best mode thereof, to one of ordinary skill in the art, is set forth more particularly in the remainder of the specification, including reference to the accompanying figures, in which.

Figure 1:
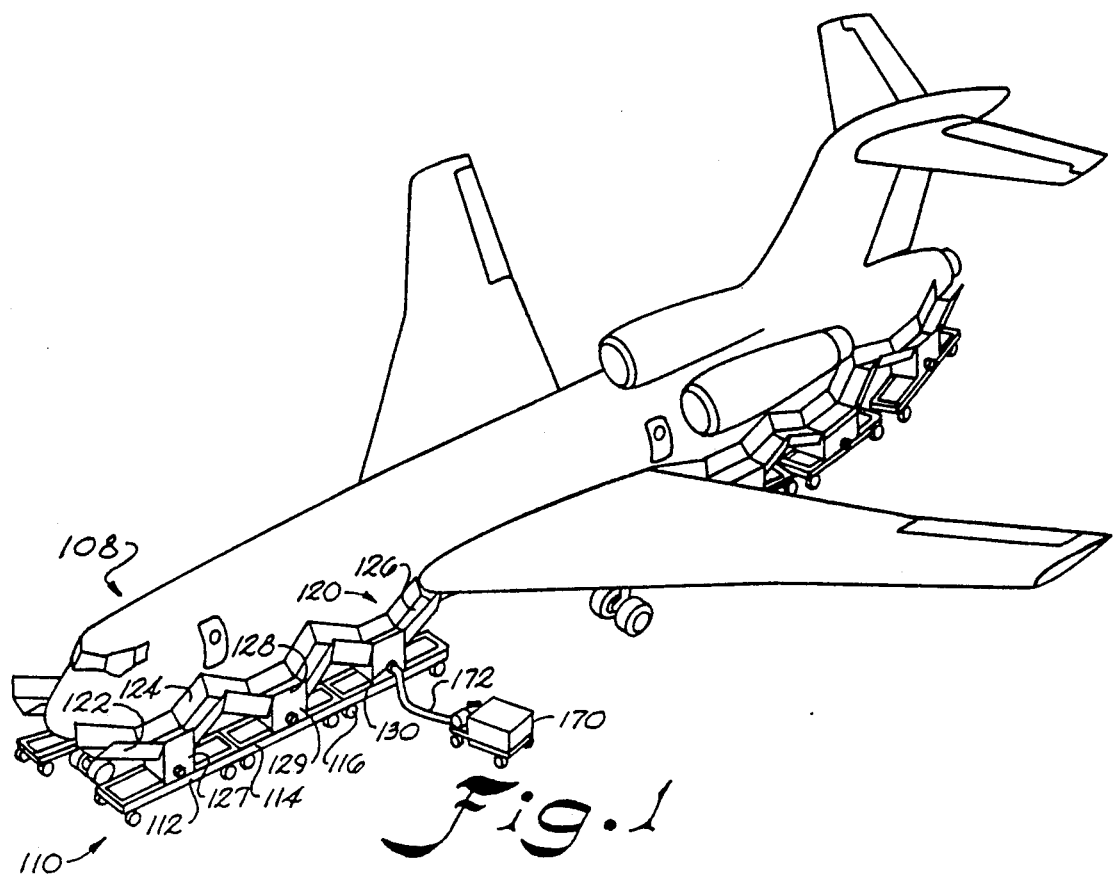
FIG. 1 is a perspective view of an airplane, having a plurality of collection units in accordance with the present invention interconnected and positioned along edges thereof.

Repeat use of reference characters in the present specification and drawings is intended to represent same or analogous features or elements of the invention.

MODES FOR CARRYING OUT THE INVENTION

It is to be understood by those of ordinary skill in the art that the present discussion is a description of exemplary embodiments only, and is not intended as limiting the broader aspects of the present invention, which broader aspects are embodied in the exemplary constructions.

Referring to FIG. 1, an airplane 108 is illustrated having a plurality of units generally 110 positioned thereabout. Such units partially make up the present collection system generally 150 of the present invention.

Each unit is an apparatus in accordance with the present invention for use in the removal of coatings from large objects. Specifically, the present invention is directed to the removal of paint from airplanes. However, it is also within the scope of the present invention to remove other coatings, such as grease and dirt, from airplanes with the apparatus and system of the present invention. Furthermore, it is also within the scope of the invention to remove such coatings from other large objects, such as freight cars, ships, etc. employing the present apparatus, system and method. However, to facilitate understanding, the present description is particularly directed to the removal of paint from large airplanes.

Such paint stripping operation generally requires the application of a solvent composition to the surfaces of the airplane for dissolving the paint thereon. Generally, the solvent employed has a sufficiently high vapor pressure to be present in both liquid phase and a gaseous vapor phase at stripping temperatures. Thus, solvent compositions containing components such as methylene chloride, which have a sufficiently high vapor pressure at room temperature to exist as both a liquid and a vapor and which are employed at room temperature in stripping operations, are within the scope of the present invention. Also with the scope of the present invention are those solvents which, although present as a liquid at room temperature, are heated for stripping, with such heating increasing the vapor pressure of the solvent such that it exists as both a liquid and a vapor at stripping temperatures.

Furthermore, solvents which do not fume at the stripping temperature, whether that temperature is room temperature or higher, may also be collected by the apparatus and system of the present invention. However, it will be understood from the present discussion that such apparatus and system are specifically designed to address the particular problems of collecting spent solvent which has a sufficiently high vapor pressure at operating temperature to exist as both a liquid and a gas.

Referring to the figures of the drawings, it will be noted that each figure generally illustrates the apparatus or system of the present invention. As each figure illustrates and emphasizes various modifications of specific features, all within the scope of the present invention, features which are the same or similar from one figure to the next are generally represented by like hundred series numbers, such that, for example, receptacle 120 of FIG. 1 is analogous to the receptacle 220 of FIG. 2 and the receptacle 320 of FIG. 3, etc.

Thus, referring to FIG. 1, the apparatus 110 of the present invention includes a portable carriage 112 which is positionable beneath the airplane 108. The carriage includes lower frame 114 and wheels or casters 116, although, of course, other means for moving the carriage such as, for example, sliding or rail engaging members, are also within the scope of the present invention.

A receptacle 120 is carried on the carriage and includes spaced side walls 122 and 124. Generally, such side walls extend vertically upwardly with lower portions thereof being joined by a lower wall 126. The receptacle further defines a receptacle bottom portion which, in the present case, is the bottom 127 of collection tank 128. Tank 128, which is preferably defined at the center of receptacle 120, includes tank side walls 129. The receptacle side walls and opposed lower walls 126 extend outwardly and upwardly from upper portions of such tank side walls with the receptacle side walls preferably further diverging outwardly from the receptacle lower wall.

Although in the present embodiment the receptacle bottom portion is at the bottom of tank 128, it is to be understood that the receptacle bottom portion may be generally formed by the intersection at the lowermost point of the receptacle of the side walls with the lower wall, or, in the case of a receptacle which defines no specific lower wall, by the intersection at the lowermost point of the receptacle of side walls which are joined at and diverge from lower portions thereof.

Thus, spent solvent in both liquid and gas phases falling from the surfaces of the airplane 108 is received by receptacle 120 having side walls 122 and 124 which preferably diverge outwardly as well as extending upwardly in order to direct the received spent solvent in both phases to the receptacle bottom portion. In the present embodiment, such bottom portion is defined at the bottom of a collection tank in which the solvent is received such that the vapor phase of the solvent is trapped above the heavier liquid phase by the lighter air thereover. Although not specifically shown in the illustration of FIG. 1, an exhaust port is located above the receptacle bottom portion, and therefore, in the present embodiment, above the bottom of the collection tank, for removing the vapor phase.

Figure 2:
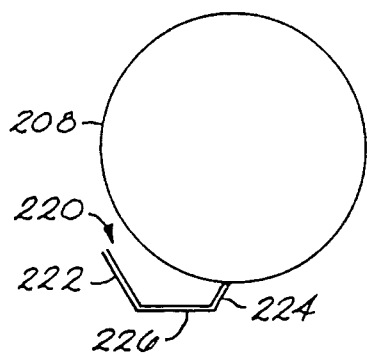
FIG. 2 is a schematic diagram of one embodiment of the receptacle of the present invention positioned beneath an edge of an airplane.
Figure 3:
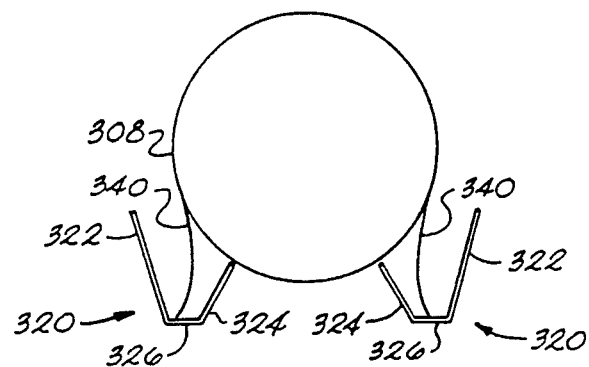
FIG. 3 is a schematic diagram of receptacles in accordance with the present invention positioned beneath opposite sides of an airplane with flexible sheets secured to the airplane extending downwardly into the receptacles to direct the flow of paint stripper.
Figure 4:
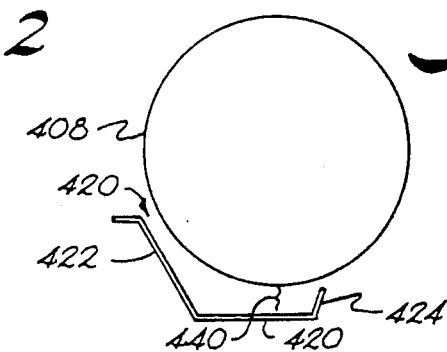
FIG. 4 is a schematic diagram illustrating a receptacle in accordance with the present invention positioned under an edge of an airplane with a flexible sheet extending downwardly from the lowermost portion of the fuselage directing the flow of paint stripper into the receptacle.

Alternative receptacle configurations are illustrated in FIGS. 2, 3 and 4 with the fuselage of the airplane schematically represented at 208, 308 and 408, respectively. The receptacle 220 of FIG. 2 defines side walls 222 and 224 which extend vertically upwardly and are joined at lower portions thereof by lower wall 226. The respective side walls of such receptacle diverge greatly from the lower wall and are of variable height, with wall 222 extending upwardly to more than twice the height of wall 224. Thus, the receptacle may be positioned further under the edge of the fuselage than is possible with the receptacle of FIG. 1 because of the abbreviated nature of the inner side wall 224. Outer wall 222 extends upwardly beyond the top of wall 224 to prevent splattering of liquid solvent as it is received by the receptacle.

FIG. 3 illustrates a pair of receptacles 320 having side walls 322 and 324 extending vertically upwardly from a lower wall 326. While diverging from such lower wall, the side walls of FIG. 3 do not diverge as greatly as those of FIGS. 1 and 2 discussed above. However, like the embodiment of FIG. 2, the inner side walls 324 extend upwardly to only one-half the height of outer side walls 322 such that the receptacle may be positioned beneath the edge of fuselage 308 with the outer side walls having sufficient height to preclude splattering of liquid solvent falling from the fuselage surfaces. FIG. 3 further illustrates flexible sheets 340 extending downwardly from the fuselage to direct the flow of spent solvent in the liquid and vapor phases into receptacle 320. The function of such flexible sheet will be discussed in greater detail below with respect to FIGS. 6 and 7.

FIG. 4 illustrates yet another embodiment of the receptacle in accordance with the present invention with upstanding side wall 422 greatly exceeding the height of abbreviated side wall 424 such that receptacle 420 may be positioned beneath fuselage 408 and extended more than halfway thereunder. Flexible sheet 440 is attached to and extends downwardly from the midpoint of the underside of fuselage 408 for directing spent solvent in the liquid and gas phases into receptacle 420.

Figure 6:
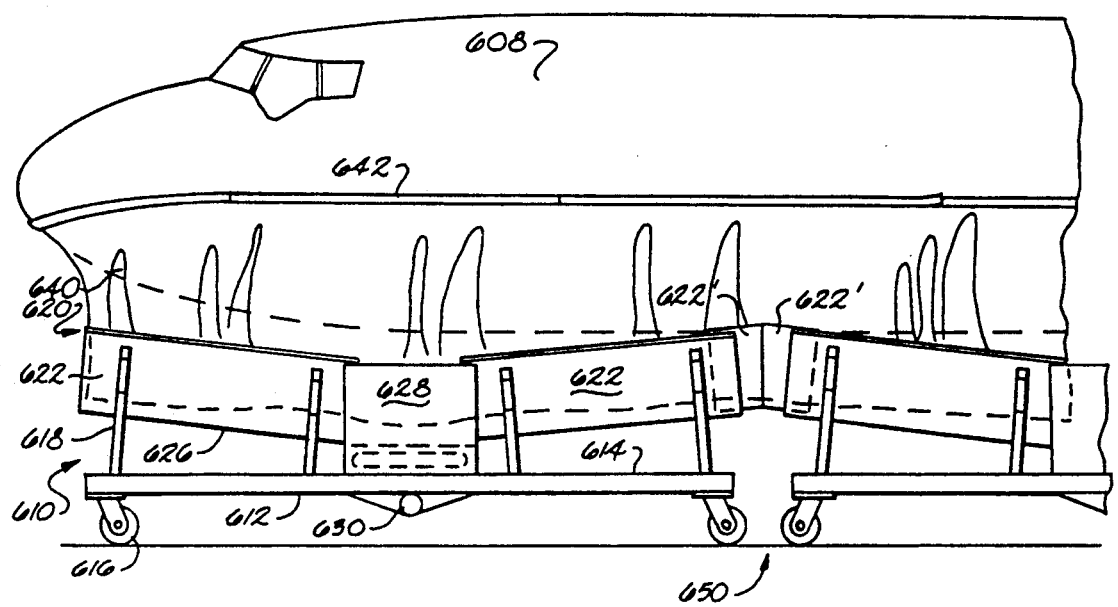
FIG. 6 is a close-up view of a portion of an airplane having interconnected units positioned at a side thereof with a flexible sheet secured to the plane at a midportion extending downwardly into the receptacles of the collection units for directing the flow of paint stripper thereinto.
Figure 7:
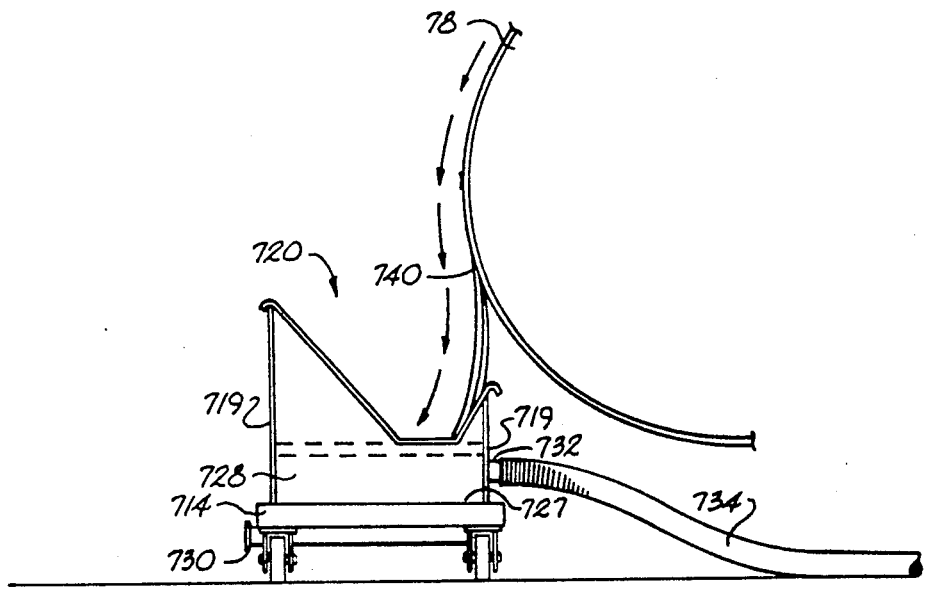
FIG. 7 is a cross-sectional schematic view of a trough of FIG. 6 with arrows representing the flow of paint stripper from the surface of the plane into the receptacle.

The function of such flexible sheets with respect to the present invention is best understood from FIGS. 6 and 7 with FIG. 6 generally illustrating a system 650 of individual unit 610 in accordance with the present invention having portable carriages 612 each having a lower frame 614 and wheels 616 and with each carriage further having upstanding support members 618 for supporting the receptacle 620.

Flexible sheet 640 is secured to airplane 608 by tape 642. By the method of the present invention, the upper surfaces of an airplane may be stripped without spent solvent having dissolved paint components therein being allowed to run down onto lower surfaces. Such is often desirable when only the upper surfaces of the airplane are painted, as is the case with some commercial airlines, and it is preferable to keep solvent and dissolved paint from running onto the lower unpainted surfaces. Thus, by the present method, a flexible sheet is secured to the fuselage of the airplane below the upper surfaces to be stripped and extends downwardly into the receptacle for protecting the lower surfaces and for directing spent solvent in both the liquid and gas phases into the receptacle.

Accordingly, by the embodiment of FIG. 6, spent solvent flowing from the upper surfaces of airplane 608 is directed by flexible sheet 640 into the receptacle 620. The side walls of the receptacle in combination with inwardly inclined lower walls 626 direct the solvent to the receptacle bottom portion at the bottom of collection tank 628. FIG. 6 further illustrates a drain means 630 at the bottom of the collection tank. Again, it should be understood that the collection tank, although preferred, is not required and that such drain means provided at the bottom portion of the receptacle will allow for drainage of spent solvent in the liquid phase therefrom whether such bottom portion is defined at a collection tank bottom or merely at the lowermost portion of a receptacle which does not include such tank.

By the embodiment of FIG. 7, the receptacle 720 is supported by side walls 719 of the carriage. Thus, such side walls in combination with a solid bottom frame 714 form the collection tank 728, and therefore, the bottom portion of the receptacle 720 is at the bottom 727 of tank 728. Thus, drain port 730 is provided at bottom 727 with exhaust port 732 positioned above bottom 727 for removing the spent solvent in the vapor phase. Suction line 734 and the vapor collection system of which it is a part will be discussed in greater detail below with respect to FIG. 12.

Figure 5:
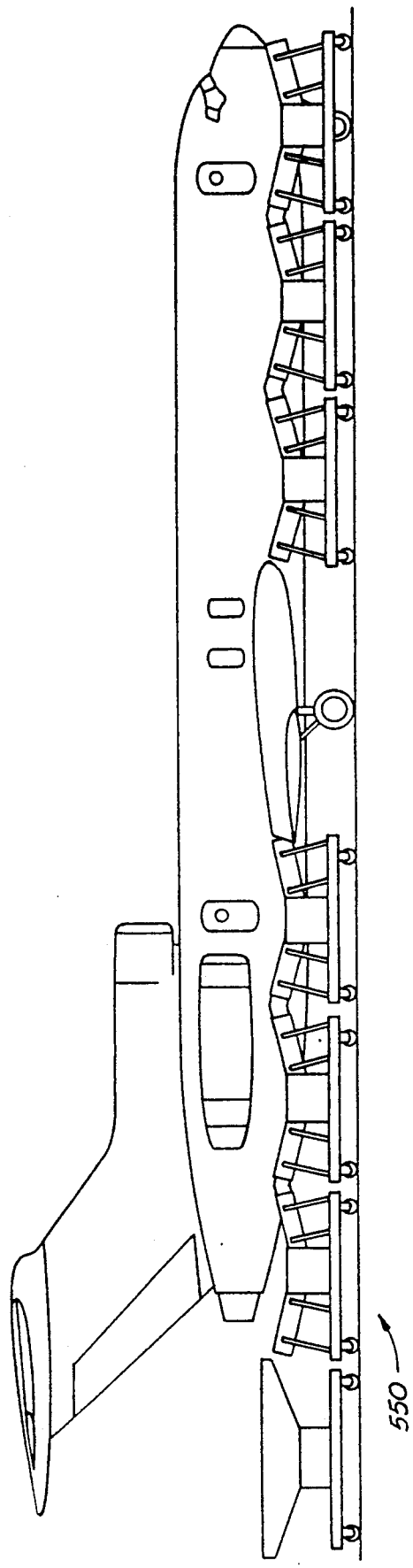
FIG. 5 is a side view of an airplane having a plurality of collection units in accordance with the present invention interconnected and positioned at an edge thereof.

Thus, as is best shown in FIGS. 1, 5 and 6, a collection system in accordance with the present invention includes a plurality of individual units interconnected by a connection means such that a continuous solvent receiving means is formed. FIG. 6 best illustrates one such connection means wherein side and lower walls of the receptacle include telescoping portions represented by outwardly extending member 622' of the adjacent side walls 622. Although not shown in FIG. 6, lower wall 626 and inner side wall 624 also include outwardly extending telescoping members which may be integral with member 622' such that an outwardly telescoping sleeve is formed at opposite ends of each receptacle. Such sleeve, generally nested within the receptacle in a closed position, may slide outwardly therefrom to an open position. Preferably, such sleeve, when pulled out to said open position is not rigidly aligned with the side walls and bottom portion of the receptacle, but rather has sufficient flexibility or freedom of movement to allow two adjacent opened sleeves extending from adjacent receptacles of identical height to be telescoped and positioned one over the other while maintaining a continuous solvent receiving means which precludes solvent spillage.

Figure 10:
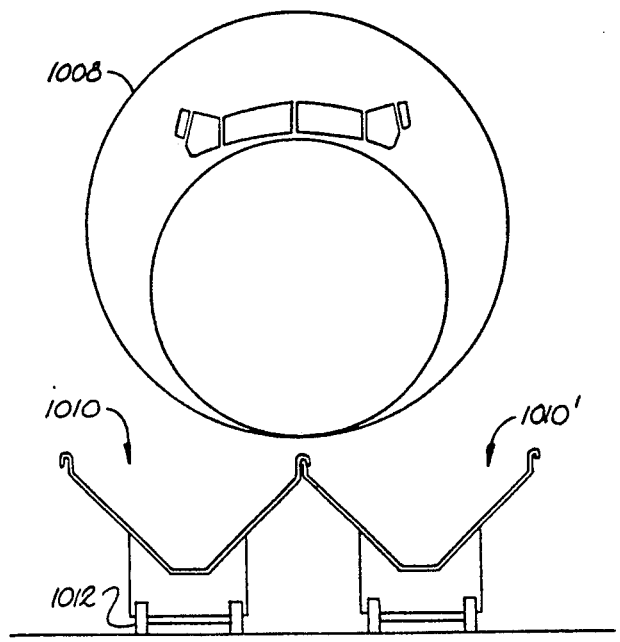
FIG. 10 is a cross-sectional schematic diagram of a pair of collection units interconnected below the fuselage of an airplane.
Figure 11:
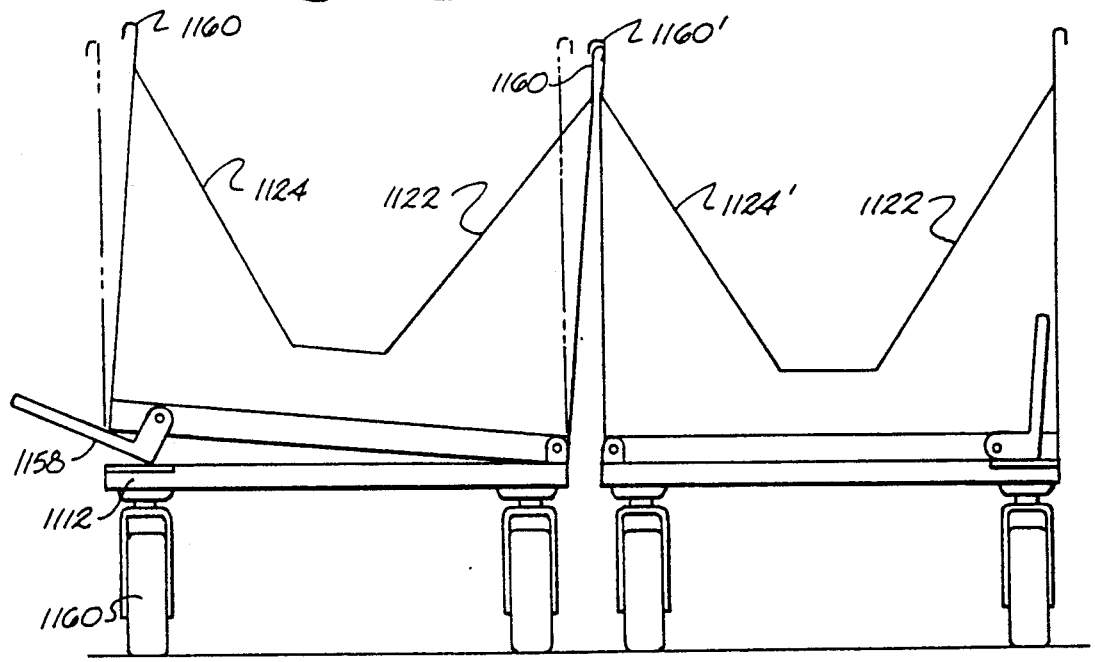
FIG. 11 illustrates one means for interconnecting collection units in accordance with the present invention.

In addition to such end-to-end connection, it is preferable that the present system includes a means for side-by-side connection of the various units. Such is desirable, as in the embodiment of FIG. 10, where two units are connected side by side in order to form a spent solvent receiving means beneath airplane 1008. FIG. 11 illustrates one means for achieving such side-by-side connection wherein a jacking means 1158 is included on carriage 1112 for tilting the receptacle carried thereon such that rolled edges 1160 and 1160' carried at the upper portions of adjacent side walls 1122 and 1124' may be brought into contact for overlapping securement as is best illustrated in FIG. 10. It should generally be noted that the casters 1116 of unit 1110 will allow same to be moved closer to unit 1110' upon securement of rolled edge 1160 within rolled edge 1160'. It should further be noted that rolled edge 1160' is slightly larger than rolled edge 1160 to allow for nesting of rolled edge 1160 therein. Thus, each receptacle to be connected by the present means must carry one large rolled edge on one side wall and a smaller rolled edge on the opposite side wall.

Figure 8:
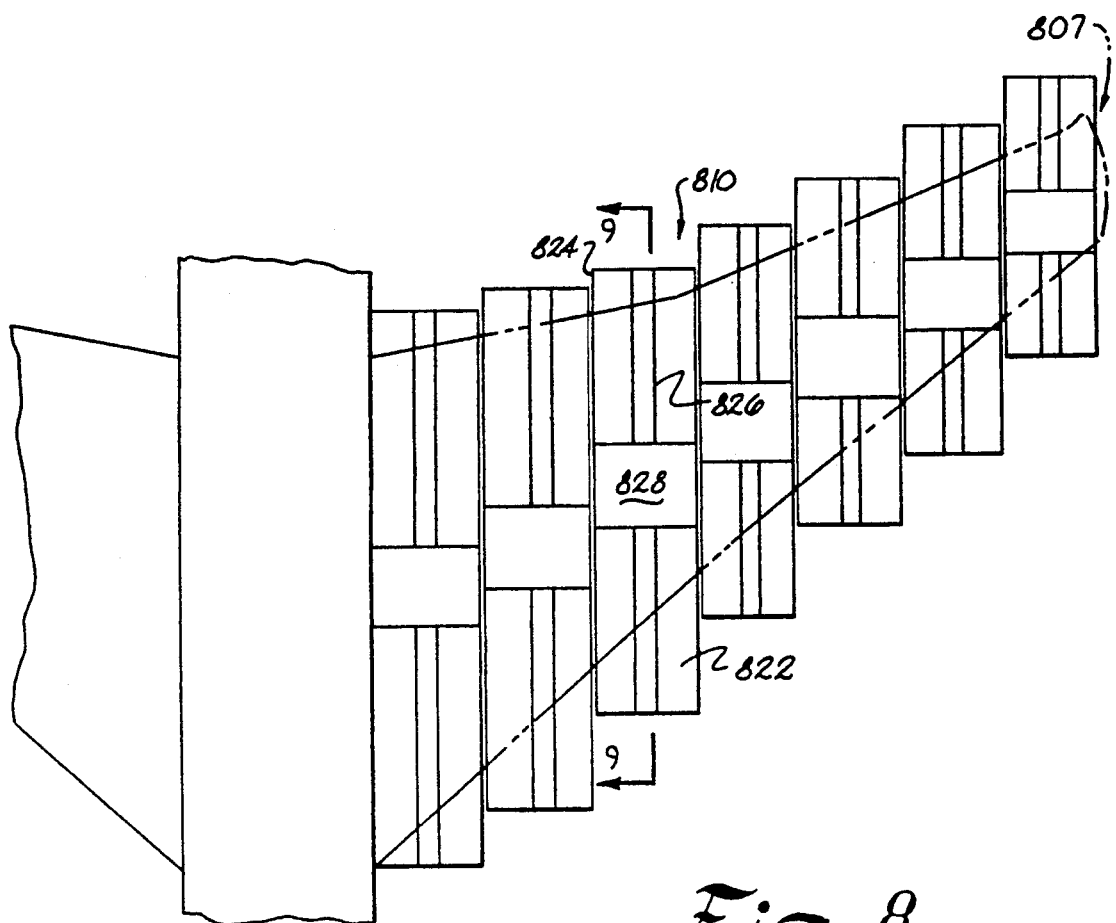
FIG. 8 is a top view of a plurality of interconnected collection units in accordance with the present invention positioned beneath an airplane wing shown in phantom.
Figure 9:
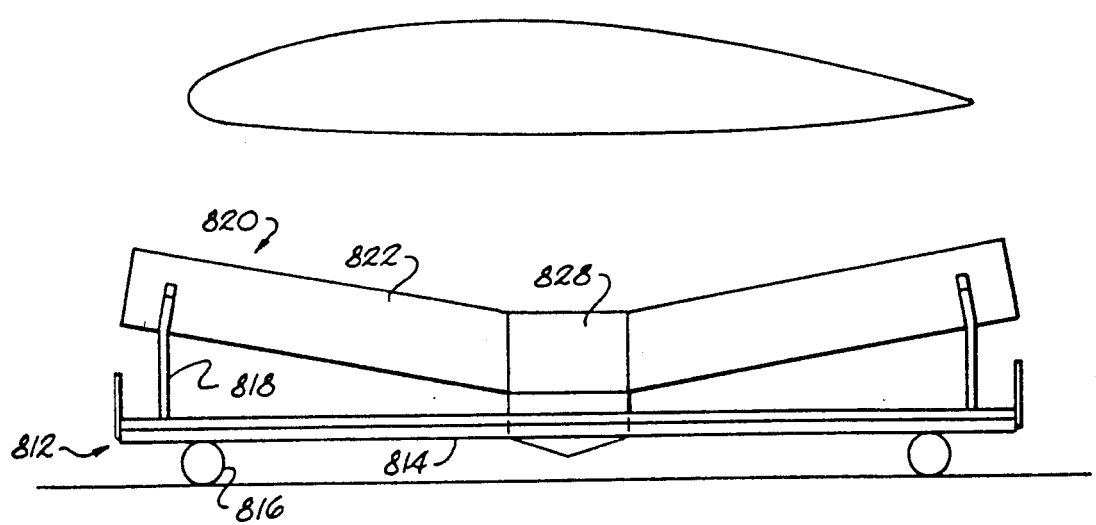
FIG. 9 is a cross-sectional view taken along the line 9—9 of FIG. 8.

Such side-by-side connection is also important when it is necessary to strip paint, not only from the fuselage, but also from the wings of the airplane. FIG. 8 illustrates a series of units of varying length connected in side by side arrangement for receiving spent solvent from wing 807 shown in phantom. Looking to one unit, 810 of that figure, side walls 822 and 824 are joined by lower wall 826. The receptacle further defines at a mid-portion thereof a collection tank 828. The side walls extend vertically upwardly from the lower wall and, together with the lower wall, extend upwardly from the collection tank as is best seen from the cross-sectional side view of FIG. 9 which shows wall 822 extending outwardly and upwardly from collection tank 828. The receptacle 820 is carried on carriage 812 having lower frame 814 and wheels 816 and is specifically supported by upstanding members 818 of the carriage.

Figure 12:
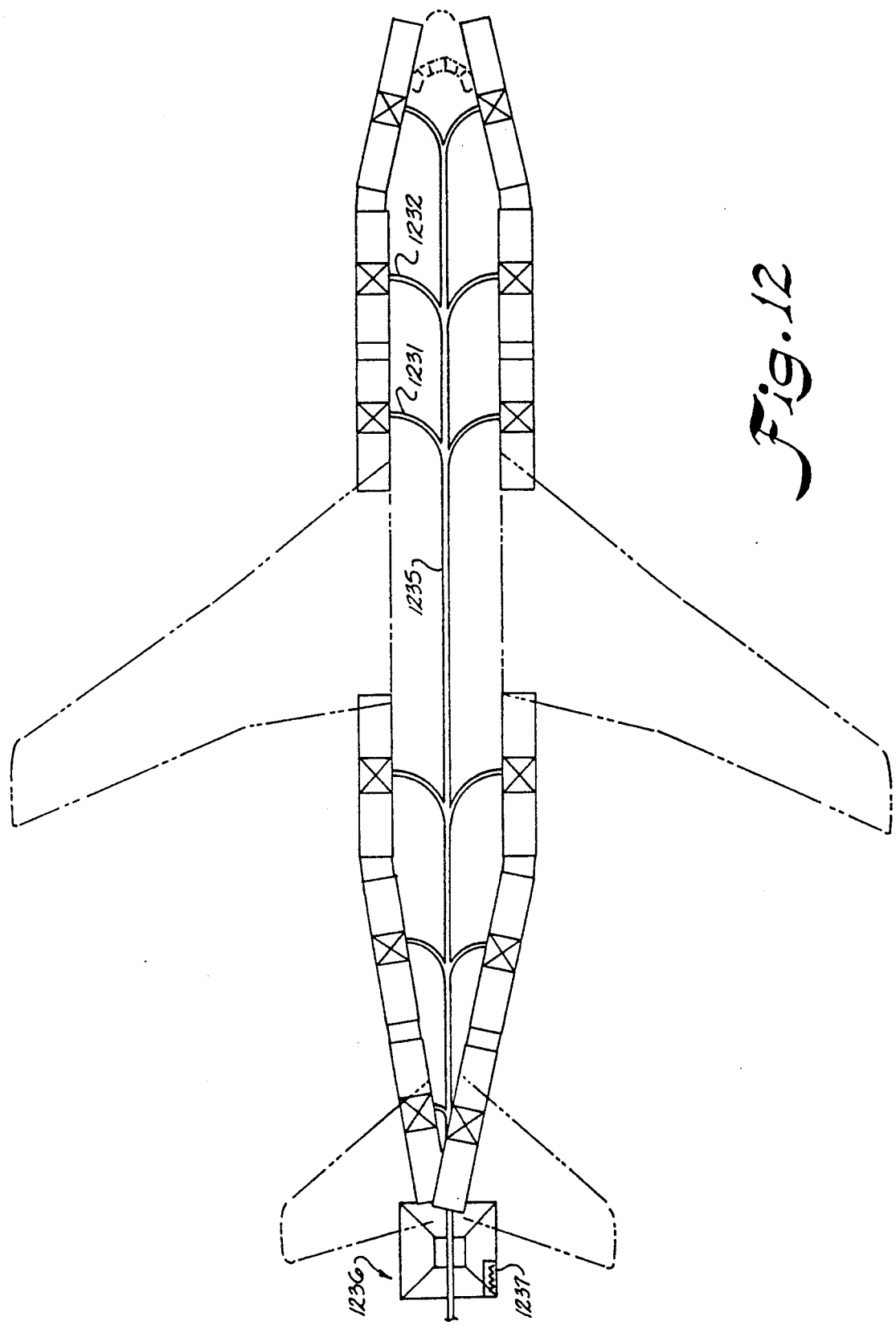
FIG. 12 is a schematic diagram of a vapor collection system in accordance with the present invention.

The solvent collection system of the present invention most preferably further includes a vapor collection means for collecting the solvent vapors trapped by air above the spent liquid solvent at the bottom portions of the various receptacles. FIG. 12 schematically illustrates a preferred embodiment of such vapor collection means wherein suction lines 1234 are associable with exhaust ports 1232 defined above the bottom portions of the receptacles for removing the solvent vapor phase therethrough. Preferably, individual suction lines 1234 communicate with a central suction line 1235 which further communicates with a vapor receiving unit 1236. In addition to a means for generating suction such as a pump, vapor receiving unit 1236 further includes a chiller 1237 for lowering the temperature of the received solvent vapor sufficiently to condense such vapor to the liquid phase. Generally, such condensed liquid solvent is of adequate purity for immediate reuse.

Similarly, the present system also preferably further includes a liquid solvent collection means. However, the liquid solvent collected by such means, such as liquid solvent receiving unit 170 of FIG. 1, is not sufficiently pure for subsequent use absent purification for separation of solvent from the paint and dirt particles dissolved therein. Further, although a centralized liquid collection system having a series of drain lines, analogous to the vapor collection means discussed above, is within the scope of the present invention, a single mobile unit such as unit 170 having drain line 172 associable with the drain ports of the various receptacles, is preferred. Thus, the receptacles are not continuously drained by a centralized system but are individually drained as the liquid solvent level of each separate unit becomes too high. Generally, the liquid solvent level of a given receptacle becomes too high as it approaches the level of the exhaust port of that receptacle. Suction of the liquid solvent through the exhaust port and to the vapor receiving unit will contaminate the relatively pure liquid phase therein which has been condensed from solvent vapors. Thus, the various receptacles are drained as needed by unit 170 with the spent liquid solvent being collected by such unit for subsequent purification and eventual reuse.

The present invention encompasses not only the individual units and collection system discussed above but a method for removing paint from airplanes and the like. The present method is specifically directed to stripping operations involving a solvent having a sufficiently high vapor pressure to be present in both the liquid and vapor phases at stripping temperature, whether such temperature is room temperature or higher. Specifically, the present method addresses the particular problems of stripping large objects with a solvent having fumes which are not readily dissipated but, rather, are heavier than air and, therefore, tend to remain low endangering workers and others in the area.

The steps of such method include providing a plurality of portable solvent receiving receptacles and positioning such receptacles beneath the airplane. The receptacles are than interconnected to form a continuous solvent receiving means which avoids dripping of spent solvent to the floor between adjacent receptacles. The solvent is then applied to the surfaces of the airplane, preferably at room temperature, for stripping the paint thereon. Spent solvent in both phases falling from the surfaces of the airplane is received in the continuous solvent receiving means formed by the interconnected receptacles. Received solvent is directed with such solvent receiving means to bottom portions of the various receptacles at which the lighter vapor phase is trapped above the heavier liquid phase by the lighter air thereover. The trapped vapor phase is continuously removed from the various receptacles through exhaust ports defined therein.

Preferably, such removed vapor is collected at a centralized location and chilled to condense same to the liquid phase. The spent liquid phase in the various receptacles is also collected for subsequent purification.

The present method is also adaptable for use in the removal of paint from the upper surfaces only of airplanes. It is common among some commercial airliners and private owners to paint only the top half of airplanes. When stripping the paint from such top surfaces it is obviously preferred that spent solvent having paint and dirt particles dissolved therein not be allowed to drip onto the lower unpainted surfaces such that, in essence, the entire airplane must be stripped as such lower surfaces are stained by the dripping dissolved paint. Thus, the present method may further include the step of securing a flexible sheet, such as polyethylene, to the surfaces of the airplane below the upper surfaces to be stripped such that lower edges of the sheet extend downwardly into the continuous solvent receiving means formed by the interconnected receptacles. During stripping such sheet serves to protect the lower unpainted surfaces from dripping spent solvent. Further, such sheet also aids in directing the spent solvent in both the liquid and vapor phases downwardly into the spent solvent in both the liquid and vapor phases downwardly into the spent solvent receiving means. Thus, it may occasionally be preferred to provide such a sheet merely for its directing function even when specific surfaces do not require protection. Such is illustrated in the schematic diagram of FIG. 4 wherein a single sheet 440 is attached to the lowermost surface of airplane 408 such that spent solvent may flow therealong into receptacle 420.

These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to be limitative of the invention so further described in such appended claims.

Thus, for the present invention, features illustrated or described as part of one embodiment can be used on another embodiment to yield a still further embodiment.

What is claimed is:

1. An apparatus for use in the removal of coatings from airplanes, said removal requiring the application of a solvent composition to the surfaces of an airplane for dissolving a coating thereon, said solvent composition having a sufficiently high vapor pressure to be present in both a liquid phase and a gaseous vapor phase at stripping temperatures, said solvent in said vapor phase being lighter than said liquid phase and heavier than air, comprising:

a portable carriage positionable beneath said airplane;

a receptacle having spaced side walls and carried by said carriage, said side walls extending vertically upwardly, said receptacle further defining a receptacle bottom portion, said receptacle receiving spent solvent in both said liquid and said vapor phases after application of said solvent to said airplane surfaces and dissolution of said paint therein, said side walls directing said received spent solvent in both phases to said receptacle bottom portion such that said vapor phase is trapped above said heavier liquid phase by the lighter air thereover; and an exhaust port located above said receptacle bottom portion for removing said vapor phase.

2. An apparatus as set forth in claim 1 wherein said side walls diverge outwardly from said receptacle bottom portion.

3. An apparatus as set forth in claim 1 further including a drain means at said receptacle bottom portion for removing said spent solvent in said liquid phase.

4. An apparatus as set forth in claim 1 wherein said receptacle further defines a collection tank having said receptacle bottom portion defined at a bottom of said tank.

5. An apparatus as set forth in claim 1 wherein said solvent compositions includes methylene chloride as a major component thereof.

6. A collection system for use in the removal of coatings from airplanes, said removal requiring the application of a solvent composition to the surfaces of an airplane for dissolving a coating thereon, said solvent composition having a sufficiently high vapor pressure to be present in both a liquid phase and a gaseous vapor phase at stripping temperatures, said solvent in said vapor phase being lighter than said liquid phase and heavier than air, comprising:

a plurality of spent solvent collection units, each unit comprising:

a portable carriage positionable beneath said airplane;

a receptacle having spaced side walls and carried by said carriage, said side walls extending vertically upwardly, said receptacle further defining a receptacle bottom portion, said receptacle receiving spent solvent in both said liquid and said vapor phases after application of said solvent to said airplane surfaces and dissolution of said paint therein, said side walls directing said received spent solvent in both phases to said receptacle bottom portion such that said vapor phase is trapped above said heavier liquid phase by the lighter air thereover;

an exhaust port located above said receptacle bottom portion for removing said vapor phase; and connection means for interconnecting said spaced side walls of said receptacles thereby interconnecting said collecting units such that a continuous solvent receiving means is formed along the length and width of said interconnected units.

7. A collection system as set forth in claim 6 wherein said connection means includes outwardly telescoping sleeve members carried at opposite ends of said receptacle side walls for end-to-end connection of said plurality of units.

8. A collection system as set forth in claim 6 wherein said connection means includes hooking elements defined at upper portions of said receptacle side walls for side-to-side connection of said plurality of units.

9. A collection system as set forth in claim 6 further including a vapor receiving unit having suction lines extending therefrom and communicating with said exhaust ports of said interconnected spent solvent collection units for drawing said solvent in said vapor phase from said receptacles of said collection units to said vapor receiving unit, said vapor receiving unit further including a chiller for lowering the temperature of said received solvent in said vapor phase sufficiently to condense same to said liquid phase.

10. A collection system for use in the removal of coatings from airplanes, said removal requiring the application of a solvent composition to the surfaces of an airplane for dissolving a coating thereon, said solvent composition having a sufficiently high vapor pressure to be present in both a liquid phase and a gaseous vapor phase at stripping temperatures, said solvent in said vapor phase being lighter than said liquid phase and heavier than air, comprising:

a plurality of spent solvent collection units, each unit comprising:

a portable carriage positionable beneath said airplane;

a receptacle having spaced side walls and carried by said carriage, said side walls extending vertically upwardly, said receptacle further defining a receptacle bottom portion, said receptacle receiving spent solvent in both said liquid and said vapor phases after application of said solvent to said airplane surfaces and dissolution of said paint therein, said side walls directing said received spent solvent in both phases to said receptacle bottom portion such that said vapor phase is trapped above said heavier liquid phase by the lighter air thereover;

an exhaust port located above said receptacle bottom portion for removing said vapor phase; and drain means at said receptacle bottom portion for removing said liquid phase;

connection means for interconnecting said spaced side walls of said receptacles thereby interconnecting said collection units such that a continuous solvent receiving means is formed along the length and width of said interconnected units.

11. A collection system as set forth in claim 10 further including a vapor receiving unit having suction lines extending therefrom and communicating with said exhaust ports of said interconnected spent solvent collection units for drawing said solvent in said vapor phase from said receptacles of said collection units to said vapor receiving unit, said vapor receiving unit further including a chiller for lowering the temperature of said received solvent in said vapor phase sufficiently to condense same to said liquid phase.

12. A collection system as set forth in claim 10 further including a liquid solvent receiving unit associable with each of said drain means for collecting said solvent in said liquid phase from said receptacle bottom portions of said collection units.

13. A method for removing paint from airplanes using a solvent for dissolving said paint, said solvent having a sufficiently high vapor pressure to be present in both a liquid and a gaseous vapor phase at stripping temperatures, said solvent in said vapor phase being lighter than said liquid phase and heavier than air, comprising:

providing a plurality of portable solvent receiving receptacles;

positioning said receptacles beneath said airplane;

interconnecting said receptacles at spaced side walls thereof thereby forming a continuous solvent receiving means;

stripping said paint from the surfaces of said airplane by applying said solvent thereto;

receiving spent solvent in both said liquid and said vapor phases in said continuous solvent receiving means;

directing said received spent solvent in both phases to bottom portions defined in said various receptacles such that solvent in said vapor phase is trapped above said heavier liquid phase by the lighter air thereover at said various bottom portions of said interconnected receptacles; and removing said vapor phase from said receptacles through exhaust ports located above said receptacle bottom portions.

14. A method as set forth in claim 13 wherein said step of stripping is performed by applying a solvent having methylene chloride as a major component thereof to said airplane surfaces.

15. A method as set forth in claim 13 further including collecting said spent solvent in said vapor phase removed from said various exhaust ports of said interconnected receptacles.

16. A method as set forth in claim 15 further including chilling said collected spent solvent in said vapor phase to condense same to a liquid phase.

17. A method as set forth in claim 13 further including collecting spent solvent in said liquid phase from said receptacle bottom portions.

18. A method as set forth in claim 13 wherein said step of stripping is performed at room temperature.

19. A method for removing paint from upper surfaces of airplanes using a solvent for dissolving said paint, said solvent having a sufficiently high vapor pressure to be present in both a liquid and a gaseous vapor phase at ambient temperatures, said solvent in said vapor phase being lighter than said liquid phase and heavier than air, comprising the steps of:

providing a plurality of solvent receiving receptacles;

positioning said receptacles beneath said airplane;

interconnecting said receptacles at spaced side walls thereof thereby forming a continuous solvent receiving means;

securing a flexible sheet to the surfaces of said airplane below said upper surfaces to be stripped such that lower edges of said sheet extend downwardly into said continuous solvent receiving means formed by said interconnected receptacles;

stripping said paint from said upper surfaces of said airplane by applying said solvent thereto;

directing spent solvent in both said liquid and said vapor phases from said upper surfaces downwardly to said spent solvent receiving means with said downwardly extending sheet;

receiving spent solvent in both said phases in said continuous solvent receiving means;

directing said received spent solvent in both phases to bottom portions defined in said various receptacles forming said continuous solvent receiving means such that solvent in said vapor phase is trapped above said heavier liquid phase by the lighter air thereover at said various bottom portions of said interconnected receptacles; and removing said vapor phase from said receptacles through exhaust ports located above said receptacle bottom portions.

20. A method as set forth in claim 19 further including collecting said spent solvent in said vapor phase removed from said various exhaust ports of said interconnected receptacles.

21. A method as set forth in claim 20 further including chilling said collected spent solvent in said vapor phase to condense same to a liquid phase.

22. A method as set forth in claim 19 further including collecting spent solvent in said liquid phase from said receptacle bottom portions.

23. A method as set forth in claim 19 wherein said step of stripping is performed at room temperature.

* * * * *